United States Patent [19]

Hare et al.

[11] 3,747,641
[45] July 24, 1973

[54] SINGLE HANDLE FAUCET VALVE

[76] Inventors: Terence G. Hare, 22600 Middlebelt G-11, Farmington, Mich. 48024; Hugh McCormick, 30 Brookline Ln., Dearborn, Mich. 48120

[22] Filed: Nov. 23, 1971

[21] Appl. No.: 201,347

Related U.S. Application Data

[63] Continuation-in-part of Ser. No. 844,869, July 25, 1969, Pat. No. 3,623,510.

[52] U.S. Cl. .......................................... 137/625.41
[51] Int. Cl. ................................................ F16k 11/00
[58] Field of Search ................ 137/625.4, 625.41, 137/636, 636.1, 636.2, 636.3; 251/309, 315

[56] References Cited
UNITED STATES PATENTS

| | | | |
|---|---|---|---|
| 3,506,036 | 4/1970 | Hare | 137/636.3 |
| 2,923,315 | 2/1960 | Bletcher et al. | 137/636.1 X |
| 3,130,750 | 4/1964 | Post | 137/636.3 |
| 3,167,086 | 1/1965 | Michalski | 137/625.41 X |
| 3,276,740 | 10/1966 | Clark | 251/315 |
| 3,384,121 | 5/1968 | Spencer | 137/636.1 X |
| 3,531,085 | 9/1970 | Hansen et al. | 251/315 |
| 3,667,503 | 6/1972 | Farrell et al. | 137/625.4 |

*Primary Examiner*—Samuel Scott
*Attorney*—Arthur Raisch, John M. Kisselle et al.

[57] ABSTRACT

The single handle faucet disclosed herein comprises a faucet body which has a pair of inlets for hot and cold water and a liquid outlet. A spherical valve body is mounted for swinging movement within the body and has a spherical surface that is complementary to a similar compressible spherical surface on the faucet body. The valve body has passages extending from the spherical surface of the valve body. The passages of the valve body and the passages of the faucet body are adapted to be selectively aligned.

19 Claims, 6 Drawing Figures

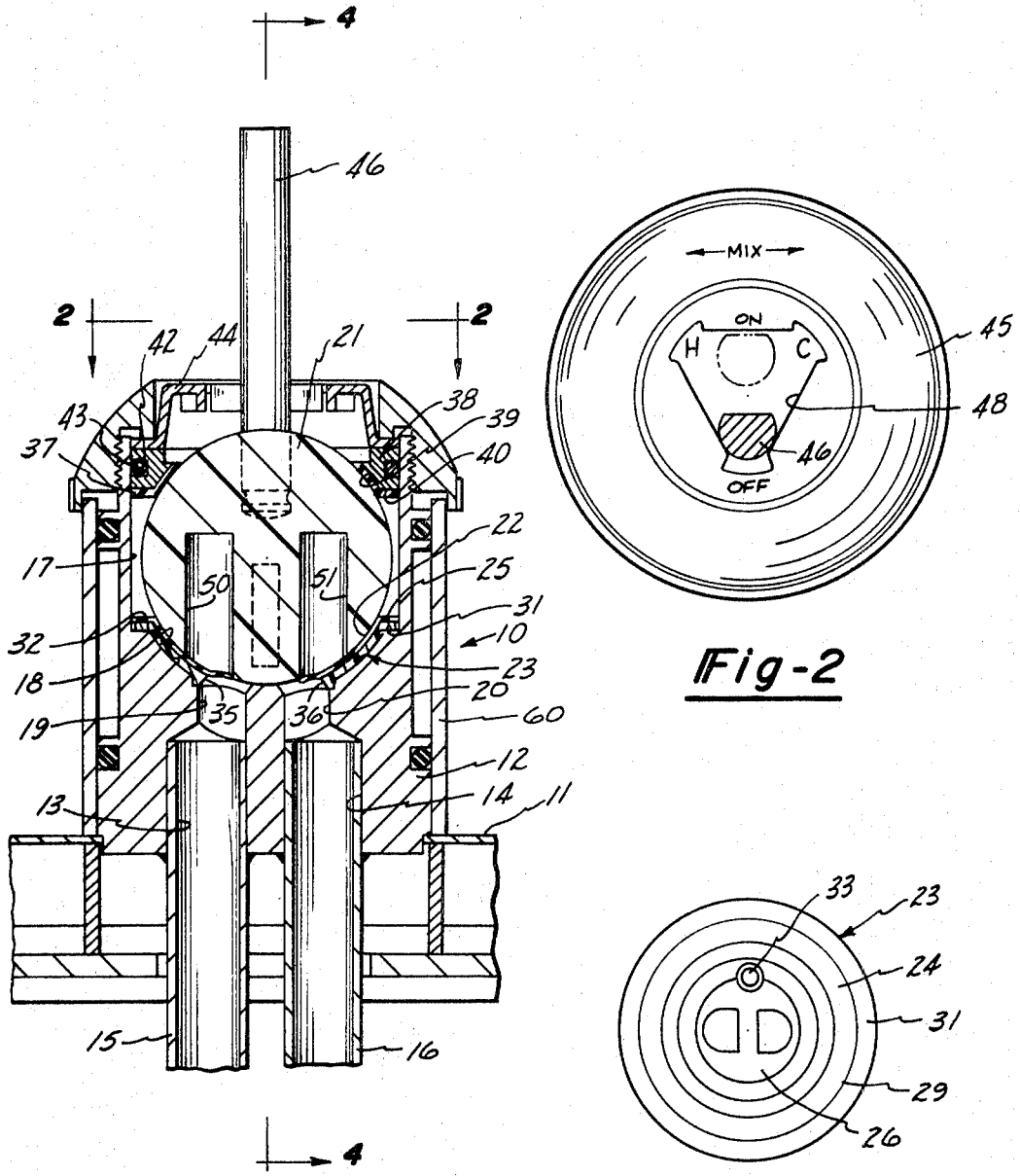

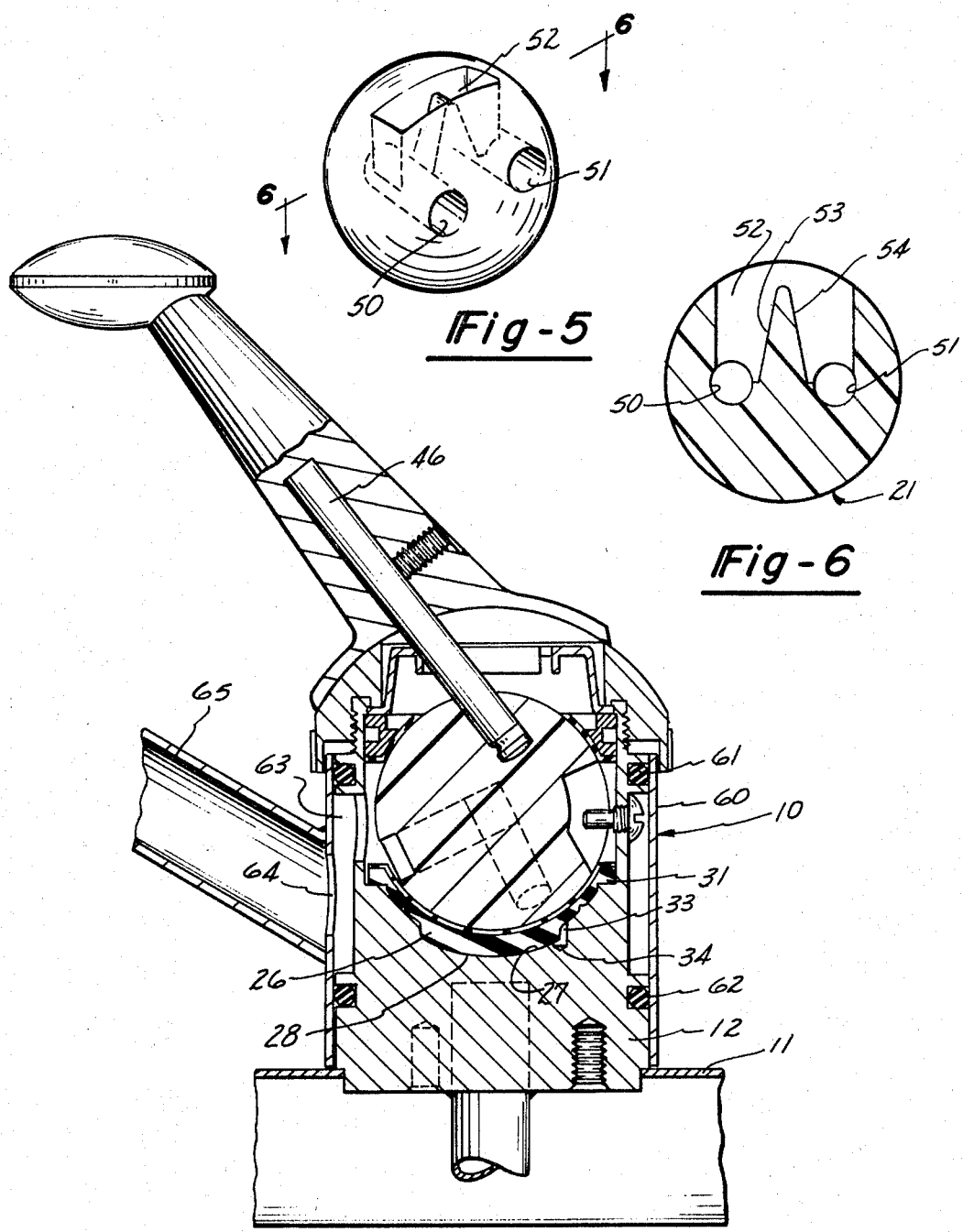

SINGLE HANDLE FAUCET VALVE

This application is a division and a continuation-in-part of copending application Ser. No. 844,869, filed July 25, 1969 titled Single Handle Faucet Valve of Terence G. Hare and Hugh McCormick, now U.S. Pat. No. 3,623,510 issued Nov. 30, 1971.

This invention relates to water faucets and particularly to single handle faucets.

BACKGROUND OF THE INVENTION

In the faucet art it is common to have what is known as a single handle faucet wherein manipulation of a single handle controls both the degree of mixture of hot and cold water as well as the volume of water which is emitted.

In U.S. Pat. No. 3,506,036, dated Apr. 14, 1970 of Terence G. Hare, there is disclosed and claimed a single handle faucet which comprises a faucet body which has a pair of inlets for hot and cold water and a liquid outlet. A valve body is mounted for swinging movement in a single plane within the faucet body and has a spherical surface that is complementary to a similar compressible spherical surface on the faucet body. The valve body has a valve seat therein and passages extend from the spherical surface of the valve body to the valve seat. A valve stem is mounted within the valve body and supports a bib which is movable toward and away from the valve seat. In one form, seals are provided on the valve and comprise spaced annular sealing members between the valve body and faucet body. In another form, the seals comprise a first annular sealing member and a spherical sealing member interposed between the spherical surface of the valve and the valve body.

In the aforementioned copending application Ser. No. 844,869, there is disclosed an improved single handle faucet that has a novel seal arrangement which minimizes any tendency for cross flow between the passages of the faucet body.

Among the objects of this invention are to provide an improved single handle faucet of the type shown in the aforementioned Hare patent; wherein improved sealing is provided between the valve body and faucet body; wherein leakage between the hot and cold inlets is eliminated and entirely avoided; wherein specific provision is made for supplying sufficient water to a diverter for, in turn, supplying a spray attachment; and to provide a modified form of faucet valve wherein selective control is achieved without the use of a valve stem.

SUMMARY

The single handle faucet disclosed herein comprises a faucet body which has a pair of inlets for hot and cold water and a liquid outlet. A valve body is mounted for swinging movement in a single plane within the faucet body and has a spherical surface that is complementary to a similar compressible spherical surface on the faucet body. The valve body has a valve seat therein and passages extend from the spherical surface of the valve body to the valve seat. The passages of the valve body and the passages of the faucet body are adapted to be selectively aligned. Seals are provided on the valve.

In accordance with the invention, a spherical compressible sealing surface is provided by a resilient body having a spherical relatively incompressible layer of a low friction material thereon which is dimensionally stable and resistant to hot water. The resilient body has a thickened portion in the area of the inlets of the faucet body which thickened portion extends into a recess of the faucet body. The openings and inlets preferably have a D-shaped configuration. The faucet body further includes novel passages permitting free flow of water therethrough.

Further in accordance with a modified form of the invention a novel spherical valve is provided that has spaced passages which receive liquid from the inlets and mix the liquid for passage outwardly from the faucet valve.

DESCRIPTION OF THE DRAWINGS

FIG. 1 is a fragmentary part sectional view of a faucet embodying the invention.

FIG. 2 is a fragmentary sectional view taken along the line 2—2 in FIG. 1.

FIG. 3 is a bottom plan view of one of the sealing members.

FIG 4 is a fragmentary sectional view taken along the line 4—4 in FIG. 1.

FIG. 5 is a perspective view of the valve ball.

FIG. 6 is a sectional view taken along the line 6—6 in FIG. 5.

DESCRIPTION

Referring to FIGS. 1 and 4, the faucet 10 is adapted to be mounted on a sink 11 or the like, as presently described. The faucet 10 comprises a faucet body 12 which has spaced vertical inlets 13, 14 in the lower end thereof into which pipes 15, 16 extend. Body 12 is formed with a cylindrical cavity 17 that has an open upper end. The lower wall of the cavity is formed with a generally spherical surface 18. Passages 13, 14 communicate through passageways 19, 20 with the surface 18. A spherical valve body 21 which has a spherical lower end 22 extends into the cavity 17 with the spherical surface thereof engaging a spherical seating surface on a sealing member 23.

As shown in FIGS. 1, 3 and 4, sealing member 23 comprises a body of rubber or other similar resilient material 24 and a layer 25 of relatively incompressible dimensionally stable low friction material bonded to the upper surface thereof. A satisfactory material comprises Teflon. As shown in FIG. 3, the sealing member 23, and particularly the rubber body 24 thereof, includes a central thickened portion 26 which is generally circular and extends into a complementary recess 27, the bottom surface 28 of the recess being generally concave. The portion of the rubber body 24 surrounding the thickened portion 26 is formed with annular serrations 29 in order that the body may have better resilient sealing contact with the spherical portion 30 of the surface 18. The sealing member 23 also includes a peripheral lip 31 that engages a complementary shoulder 32 on the faucet body 12. Finally, the rubber body 24 of the sealing member 23 includes a small axial projection 33 that extends into a complementary opening 34 to circumferentially locate the sealing member and thereby align openings 35, 36 therein with the upper ends of the passageways 19, 20.

An annular seal 37 which has a generally obtuse angle cross section in the untensioned state is provided adjacent the upper end of the spherical portion 22 and is urged into sealing contact therewith by a collar 38 that extends into the cylindrical cavity 17 and has surfaces 39, 40 that extend upwardly and inwardly and horizontally, respectively, to engage the legs of the seal 37 and urge the inclined leg against the surface of the spherical member 22. The surface of collar 38 which engages the seal 37 has annular ribs 41 thereon which firmly grip the seal 37 and urge it against the spherical surface of the valve body 22. The collar 38 is formed with an annular groove 42 in which an 0-ring 43 is seated to provide a seal between the seal collar 37 and the wall of the cavity 17.

A guide ring 44 extends within the cavity 17 over the seal collar 38. A faucet nut 45 is threaded on the upper end of the valve body 12 and holds the guide ring 44 and, in turn, the collar 38 in position to, in turn, cause the seal 37 to engage the surface of the spherical portion 22 of the valve body 22 and urge it toward surface 25.

The valve ball 21 includes a generally cylindrical rod 46 which is D-shaped in cross section and extends upwardly through a generally triangular opening 48 in the guide ring 44.

The seal 37 is preferably made of a low friction material which is resistant to hot water and is dimensionally stable. A satisfactory material comprises Teflon. The valve body 21 is also preferably made of a low friction dimensionally stable material that is resistant to hot water and is different from material of seals 37, 23. A satisfactory material comprises a phenyline oxide type such as made by General Electric Company, Pittsfield, Massachusetts, and sold under the trademark NORYL.

Referring to FIGS. 1, 4, 5 and 6 the spherical valve body 21 includes spaced passages 50, 51 which are parallel and on opposite sides of a radius and extend from the surface 22 inwardly. The passages 50, 51 communicate with a chamber 52 that extends from the upper ends of the passages radially outwardly to the periphery of the valve body 21 at a right angle to the plane containing the axes of the passages 50, 51. The chamber 52 has channels 53, 54 that are generally diverging from the upper ends of the passages 50, 51. As shown in FIG. 6, the chamber 52 includes a portion at the periphery wherein the liquid may be mixed and freely pass outwardly from the ball which forms the valve body 21. Such a construction provides for the ready passage of the liquid and the mixing thereof before passing outwardly from the faucet valve. The construction is such that the valve body 21 can be molded in a single integral piece.

Referring to FIGS. 1 and 4, a cylindrical sheet metal sleeve 60 is rotatably mounted and surrounds the body 12 with 0-rings 61, 62 in annular recesses in the body engaging the interior of the sleeve to provide a seal. Water can flow outwardly into a space 63 between the valve body 12 and the sleeve 60 and through an opening 64 in sleeve 60 to the spigot 65 on sleeve 60.

The passages 50, 51 are generally D-shaped in cross section with their straight sides adjacent one another. This shape and arrangement tends to insure a full and complete flow through the various passages and openings. The provision of the thickened portion 26 on the sealing member 23 insures a proper seal and eliminates cross-over between the inlet passages 19, 20.

By swinging the knob and, in turn, the valve body 21, the degree of registry of openings 50, 51 with respect to passages 19, 20 may be controlled; the extent of registry determining the relative amounts of hot and cold water which are delivered to the passages 50, 51.

The valve body 21 is preferably molded in one piece and has a configuration which minimizes differential shrinkage so that the spherical sealing surface can be utilized without further finishing such as grinding.

We claim:

1. In a single handle faucet, the combination comprising
  a faucet body,
  said faucet body having a pair of liquid inlets for hot and cold water and a liquid outlet,
  said faucet body having a generally spherical surface,
  a sealing member mounted on said surface and having a centrally located axially thickened portion,
  said faucet body having a complementary recess into which said thickened portion of said sealing member extends,
  said faucet body having passages extending from said inlets to said recess in said faucet body,
  said sealing member having openings through said thickened portion aligned with the passages in said faucet body,
  a valve body mounted for swinging movement within said faucet body,
  said valve body having a spherical surface complementary to said spherical surface on said sealing member,
  said valve body having passage means extending from one area on the periphery of said spherical surface of said valve body to another area of the periphery thereof to said valve seat,
  one end of said passage means terminating along said spherical surface such that said passage means is adjacent said thickened portion of said sealing member in all portions of said valve body,
  and means for guiding said valve body to selectively change the communication of the passage means in the valve body with the inlets of said faucet body.

2. The combination set forth in claim 1 wherein said passage means includes spaced passages.

3. The combination set forth in claim 1 wherein said passage means includes a chamber at one of said areas where said liquid from said spaced passages is mixed before passing to the exterior.

4. The combination set forth in claim 1 including a seal comprising an annular flexible ring of dimensionally stable low friction plastic material and means interposed between said ring and said faucet body for yieldingly urging said ring against said spherical surface of said valve body.

5. The combination set forth in claim 1 including a layer of relatively incompressible dimensionally stable low friction plastic material on said sealing member.

6. The combination set forth in claim 1 wherein said sealing member has openings therein that are generally D-shaped in cross section with the straight sides thereof adjacent one another.

7. The combination set forth in claim 1 wherein said inlets in said faucet body are generally D-shaped in cross section.

8. The combination set forth in claim 1 including annular ribs on the underside of said sealing member surrounding said axially thickened portion.

9. The combination set forth in claim 1 including a peripheral flange on said sealing member,
  said valve body having a complementary engaging surface.

10. The combination set forth in claim 1 wherein said faucet body has spaced annular grooves in the periphery thereof,
 a cylindrical member surrounding said valve body and 0-rings positioned in said groove and engaging the interior of said cylindrical member.

11. In a single handle faucet, the combination comprising
 a faucet body,
 said faucet body having a pair of liquid inlets for hot and cold water and a liquid outlet,
 said faucet body having a generally spherical surface,
 a sealing member mounted on said surface and having a centrally located axially thickened portion,
 said faucet body having a complementary recess into which said thickened portion of said sealing member extends,
 said faucet body having passages extending from said inlets to said recess in said faucet body,
 said sealing member having openings through said thickened portion aligned with the passages in said faucet body,
 a one-piece substantially spherical valve body having a spherical surface complementary to said spherical surface on said sealing member,
 said valve body having spaced passages extending from one portion of said spherical surface of said valve body to another portion of the periphery thereof,
 said passages terminating along said spherical surface such that said passages at said one portion are adjacent said thickened portion of said sealing member in all positions of said valve body,
 and means for guiding said valve body to selectively change the communication of the passages in the valve body with the inlets of said faucet body.

12. The combination set forth in claim 11 including a seal comprising an annular flexible ring of dimensionally stable low friction plastic material and means interposed between said ring and said faucet body for yieldingly urging said ring against said spherical surface of said valve body.

13. The combination set forth in claim 11 including a layer of relatively incompressible dimensionally stable low friction plastic material on said sealing member.

14. The combination set forth in claim 13 including annular ribs on the underside of said sealing member surrounding said axially thickened portion.

15. For use in a single handle faucet, the combination comprising
 a faucet body,
 said faucet body having a pair of liquid inlets for hot and cold water and a liquid outlet,
 said faucet body having a generally spherical surface,
 a sealing member mounted on said surface and having a centrally located generally circular axially thickened portion and a peripheral portion surrounding said central portion and having a relatively thinner axial dimension,
 said faucet body having a complementary recess into which said thickened portion of said sealing member extends,
 said faucet body having passages extending from said inlets to said recess in said faucet body,
 a layer of relatively incompressible dimensionally stable low friction plastic material on said sealing member,
 said sealing member having an axial projection thereon,
 said faucet body having an opening into which said projection extends.

16. The combination set forth in claim 15 wherein said sealing member has openings therein that are generally D-shaped in cross section with the straight side thereof adjacent one another.

17. The combination set forth in claim 15 including annular ribs on the underside of said sealing member surrounding said axially thickened portion.

18. The combination set forth in claim 15 including a peripheral flange on said sealing member,
 said valve body having a complementary engaging surface.

19. A sealing member for a single handle faucet valve comprising
 a body of resilient material,
 said body having a centrally located axially thickened portion and a peripheral portion surrounding said central portion and having a relatively thinner axial dimension,
 one surface of said portion having a concave spherical surface,
 a layer of relatively incompressible dimensionally stable low-friction plastic material on said spherical surface of said sealing member,
 said sealing member and said layer having spaced openings extending through the axially thickened portion thereof and said layer.

* * * * *